United States Patent
Lee

(10) Patent No.: US 10,250,671 B2
(45) Date of Patent: Apr. 2, 2019

(54) P2P-BASED FILE TRANSMISSION CONTROL METHOD AND P2P COMMUNICATION CONTROL DEVICE THEREFOR

(71) Applicant: SK Telecom Co., Ltd., Seoul (KR)

(72) Inventor: Jongmin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 207 days.

(21) Appl. No.: 15/246,222

(22) Filed: Aug. 24, 2016

(65) Prior Publication Data

US 2016/0366212 A1 Dec. 15, 2016

Related U.S. Application Data

(63) Continuation of application No. PCT/KR2015/001737, filed on Feb. 24, 2015.

(30) Foreign Application Priority Data

Feb. 24, 2014 (KR) .................... 10-2014-0021129

(51) Int. Cl.
*G06F 15/173* (2006.01)
*H04L 29/08* (2006.01)

(52) U.S. Cl.
CPC ............ *H04L 67/06* (2013.01); *H04L 67/104* (2013.01)

(58) Field of Classification Search
CPC ............................. H04L 67/06; H04L 67/104
See application file for complete search history.

(56) References Cited

U.S. PATENT DOCUMENTS

2003/0233455 A1* 12/2003 Leber .................... G02F 1/1339
709/226
2004/0088646 A1* 5/2004 Yeager .................... H04L 29/06
715/229

(Continued)

FOREIGN PATENT DOCUMENTS

CN 102612829 A 7/2012
CN 102833148 A 12/2012

(Continued)

OTHER PUBLICATIONS

Chinese Office Action dated Aug. 8, 2018, issued in corresponding Chinese Patent Application No. 201580009979.1, citing the above references.

(Continued)

*Primary Examiner* — Michael Won
(74) *Attorney, Agent, or Firm* — Hauptman Ham, LLP

(57) ABSTRACT

A P2P-based file transmission control method performed by a peer-to-peer (P2P) communication control device disposed in a communication network for connecting a client device and a peer management device, the method, implemented by one or more processors comprised in the P2P communication control device, comprising: receiving, instead of the peer management device, a peer list request message transmitted to the peer management device by the client device; sending, instead of the client device, a request for a peer list for a shared file to the peer management device; receiving the peer list from the peer management device; modifying the received peer list in accordance with a communication environment of the client device; and providing the modified peer list to the client device.

14 Claims, 4 Drawing Sheets

(56) References Cited

U.S. PATENT DOCUMENTS

| | | | | |
|---|---|---|---|---|
| 2007/0064702 A1* | 3/2007 | Bates | ............... | H04L 45/02 |
| | | | | 370/392 |
| 2008/0133538 A1* | 6/2008 | Chavez | ............ | H04L 67/104 |
| 2008/0288447 A1* | 11/2008 | Thompson | ......... | H04L 67/104 |
| 2011/0225311 A1* | 9/2011 | Liu | ............... | H04L 45/125 |
| | | | | 709/231 |
| 2011/0238756 A1* | 9/2011 | Damola | ............ | H04L 67/104 |
| | | | | 709/204 |
| 2012/0036507 A1* | 2/2012 | Jonnala | ............ | G06Q 30/02 |
| | | | | 717/178 |
| 2016/0226899 A1* | 8/2016 | Reddy | ............ | H04L 63/1425 |
| 2016/0366212 A1* | 12/2016 | Lee | ............... | H04L 67/104 |

FOREIGN PATENT DOCUMENTS

| | | |
|---|---|---|
| JP | 2011-170422 A | 9/2011 |
| KR | 10-2005-0092834 A | 9/2005 |
| KR | 10-2010-0003059 A | 1/2010 |
| KR | 10-2012-0088777 A | 8/2012 |

OTHER PUBLICATIONS

International Search Report dated May 26, 2015 for PCT/KR2015/001737, citing the above references.

Jung, Il-Dong et al., "A Scalable Resource-Lookup Protocol for Internet File System Considering the Computing Power of a Peer", Feb. 2005, pp. 89-99, vol. 32, No. 1.

Korean Office Action dated Dec. 23, 2014, citing the above references.

* cited by examiner

P2P-BASED FILE TRANSMISSION CONTROL METHOD AND P2P COMMUNICATION CONTROL DEVICE THEREFOR

CROSS-REFERENCE TO RELATED APPLICATIONS

The present application is a continuation of International Patent Application No. PCT/KR2015/001737, filed Feb. 24, 2015, which is based upon and claims the benefit of priority to Korean Patent Application No. 10-2014-0021129, filed on Feb. 24, 2014. The disclosure of the above-listed applications is hereby incorporated by reference herein in its entirety.

TECHNICAL FIELD

The present disclosure relates to P2P-based file transmission technology for distributed transmission of a specific file on the basis of peer-to-peer (P2P) communication.

BACKGROUND ART

The statements in this section merely provide background information related to the present disclosure and do not necessarily constitute prior art.

File transmission techniques are classified into a server-client model and a P2P (Peer to Peer) model.

The inventor(s) has noted that in the file transmission technique based on a server-client model, a server stores and transmits a file, whereas a client receives and uses the file. All clients are required to access the server so as to receive a desired file from the server. Therefore, the inventor(s) has noted that when a large number of clients access at the same time, a bottleneck phenomenon is caused at the server and the network.

On the contrary, in the file transmission technique based on P2P, a number of user devices perform simultaneously the functions of client and server by transmitting or receiving a file to or from each other. The inventor(s) has experienced that this technique can solve a bottleneck issue at the server and the network. The inventor(s) has noted that in P2P communication technique, user devices selectively performing the functions of client and server at the same layer depending on situations are referred to as peer.

However, the inventor(s) has noted that in typical P2P-based file transmission, resources are shared by all user devices that participate in P2P communication. Therefore, the inventor(s) has experienced that as the number of user device participants increases, traffic is also increasing in the communication network. The inventor(s) has experienced that this causes a system load at the user device and also invites variation of transmission rate depending on the specifications of the user device.

The inventor(s) has noted that for this reason, P2P-based file-distributed transmission technique has been introduced. In this technique, a file is divided into small-sized fragments, which are distributed to a number of peers and stored. Then the file is transmitted in parallel through such peers. Representatively, BitTorrent is known in the art.

For this P2P-based file-distributed transmission, a peer management server (such as Tracker of BitTorrent) that manages information about peers sharing at least part of a file with each other is additionally needed. A client that desires to receive a file should access the peer management server, receive a list of peers sharing the desired file, establish respective sessions with such peers in the received peer list, and receive a lot of fragments of the file in parallel.

By the way, in this P2P-based file-distributed transmission technique, when there is a client's request for a peer list with regard to a specific file, the peer management server randomly selects a predetermined number (e.g., fifty) of peers from among many peers sharing the specific file without considering a client's communication environment. Therefore, the inventor(s) has experienced that a communication operator suffers unnecessary increases of traffic in the IX (Internet eXchange) interworking network and has difficulty in traffic engineering of IX interworking point.

SUMMARY

In accordance with the first aspect of the present disclosure, a P2P-based file transmission control method performed by a peer-to-peer (P2P) communication control device disposed in a communication network for connecting a client device and a peer management device, the method, implemented by one or more processors comprised in the P2P communication control device, comprising: receiving, instead of the peer management device, a peer list request message transmitted to the peer management device by the client device; sending, instead of the client device, a request for a peer list for a shared file to the peer management device; receiving the peer list from the peer management device; modifying the received peer list in accordance with a communication environment of the client device; and providing the modified peer list to the client device.

In accordance with the first aspect of the present disclosure, a peer-to-peer (P2P) communication control device disposed in a communication network for connecting a client device and a peer management device, the device comprises a network interworking unit and a control unit. The network interworking unit, implemented by one or more processors, is configured to monitor messages being trans mined through the communication network to collect a peer list request message transmitted to the peer management device by the client device, receive, instead of the peer management device, the peer list request message, and transmit, instead of the peer management device, a peer list to the client device. And the control unit, implemented by one or more processors, is configured to send, instead of the client device, a request for the peer list to the peer management device, receive the peer list from the peer management device in response to the request for the peer list, modify the received peer list in accordance with a communication environment of the client device, and provide the modified peer list to the client device.

In accordance with the first aspect of the present disclosure, a P2P-based file transmission control method performed by a peer-to-peer (P2P) communication control device, the method, implemented by one or more processors comprised in the P2P communication control device, comprising: controlling, by the P2P communication control device disposed in a communication network for connecting a client device and a peer management device, transmission of fragments of a shared file to at least one client device in P2P-based file-distributed transmission, wherein the controlling comprising: monitoring messages being transmitted through the communication network to collect a peer list request message the peer list request message transmitted from the client device to the peer management device; intercepting the peer list request message, when the peer list request message is monitored; sending a request for a peer list to the peer management device based on the intercepted peer list request message; receiving the peer list transmitted from the peer management device in response to the request for the peer list; modifying the received peer list in accordance with a communication environment of the client device; and providing the modified peer list to the client device.

DETAILED DESCRIPTION

Figure 1:
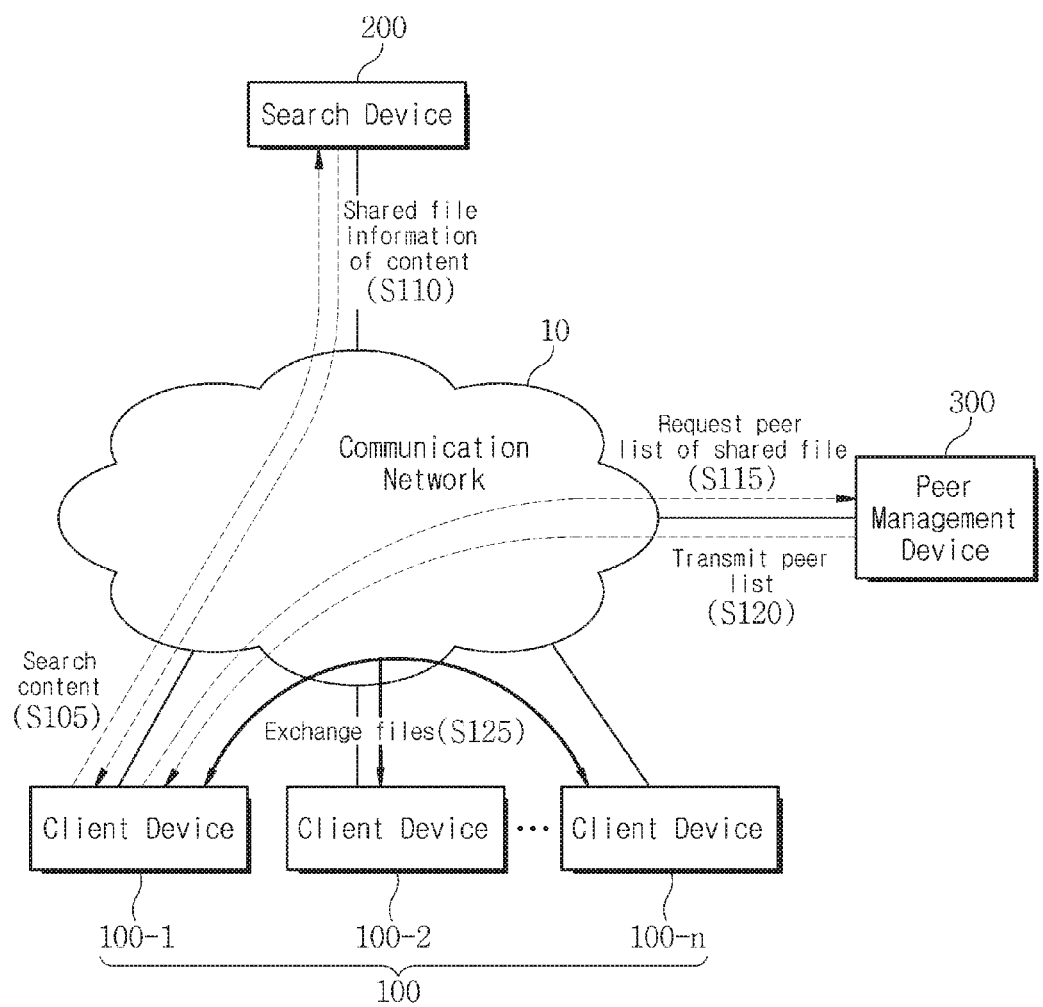
FIG. 1 is a block diagram of a schematic structure of a P2P-based file-distributed transmission system according to at least one embodiment of the present disclosure.

Hereinafter, embodiments of the present invention will be described with reference to the accompanying drawings. In the following description and the accompanying drawings, well known techniques may not be described or illustrated in detail to avoid obscuring the subject matter of the present invention. Through the drawings, the same or similar reference numerals denote corresponding features consistently.

The terms and words used in the following description and drawings are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Some embodiments of the present disclosure provide a P2P-based file transmission control method capable of selecting and providing an optimum peer list for stable transmission of file fragments to a client device in P2P-based file-distributed transmission, and also a P2P communication control device for the method. Some embodiments of the present disclosure relate to P2P-based file-distributed transmission technique in which a file is divided into small-sized fragments, in which such fragments are distributed to a number of peers and stored, and in which the file is transmitted in parallel through such peers. Before describing the present invention, the structure and operation of a P2P-based file-distributed transmission system to which this disclosure is applied will be described roughly.

Particularly, Some embodiments of the present disclosure provides a P2P-based file transmission control method, together with a P2P communication control device therefore, which allows an efficient management of P2P traffic by enabling a communication operator to properly modify a peer list, selected by a peer management device, depending on a user's communication environment without any function change or intervention of a client device or peer management device in a P2P-based file-distributed transmission system.

FIG. 1 is a block diagram of a schematic structure of a P2P-based file-distributed transmission system according to at least one embodiment of the present disclosure.

As shown in FIG. 1, the P2P-based file-distributed transmission system includes a plurality of client devices 100 connected to each other through a communication network 10, a search device 200, and a peer management device 300. The communication network 10 which is accessible by any user is formed of one or more communication networks, which are currently used or available in the future, including, but not limited to, a wireless network, such as a Wi-Fi network, a mobile communication network, cellular, LAN, WAN, CDMA, WCDMA, GSM, LTE and EPC networks, cloud computing networks and a Wibro network, as well as a wired communication network such as a cable network and an optical communication network. Additionally, the communication network 10 is formed by interworking one or more communication networks provided by different communication operators.

Each of the client devices 100 refers to a user device that participates in a P2P-based file-distributed transmission service and shares a file. For example, file sharing is performed by creating a file, storing at least some fragments of the file, and transmitting the stored file fragments. Each of the client devices 100 participates in the file sharing by performing at least one of creating, storing and transmitting a specific file. Each of the client devices 100 is implemented by installing a client program, which is running in accordance with a P2P-based file-distributed transmission protocol (e.g., BitTorrent), at a certain user device (e.g., a smart phone, a tablet PC, a desktop PC, a notebook PC, etc.) having a communication function. Each of the client devices 100 is implemented by one or more processors and/or application-specific integrated circuits (ASICs) specified for implementing respectively corresponding operations and functions described herein in the present disclosure. Each of the client devices 100 includes a communication device such as a communication modem that performs communication with various devices or wired/wireless communication networks (herein, the wire or wireless networks include, for example, one or more network interfaces including, but not limited to, cellular, Wi-Fi, LAN, WAN, CDMA, WCDMA, GSM, LTE and EPC networks, and cloud computing networks), a memory that stores various programs and data to specified for implementing respectively corresponding operations and functions described herein in the present disclosure, and one or more processors that executes programs so as to perform calculation and control, and the like.

The search device 200 is a server device that provides information (hereinafter, referred to as shared file information) about a file (hereinafter, referred to as a shared file)

shared through a P2P-based file-distributed transmission service. For example, the search device stores many pieces of shared file information, retrieves a list of one or more shared files corresponding to a certain keyword (a content name, a file name, etc.), and provides shared file information about a selected shared file among them. The search device 200 is any server device that provides at least one kind of shared file information, such as a server device that supports a P2P-based file transmission community, web surfing, and the like. Herein, shared file information provided by the search device 200 is metadata that contains information required for receiving a shared file, including one or more of a unique identification value (e.g., a unique hash value) of the shared file, address information (e.g., URL) of the peer management device 300 that manages peer information of the shared file, directory information of the shared file, a creation date of the shared file, a creator, a fragment size of the shared file, and a file name of the shared file. In this case, a unique identification value of a shared file may be created by hash-computing, based on a predetermined hash algorithm, one or more kinds of information, such as directory information about a stored shared file, a fragment size of a shared file, a file name, etc., contained in shared file information. The search device 200 is implemented by one or more processors and/or application-specific integrated circuits (ASICs) specified for implementing respectively corresponding operations anti functions described herein in the present disclosure. To communicate with the client devices 100 and the peer management device 300 through the communication network 10, the search device 200 comprises a communication device such as a communication modem that performs communication with various devices or wired/wireless communication networks (herein, the wire or wireless networks include, for example, one or more network interfaces including, but not limited to, cellular, Wi-Fi, LAN, WAN, CDMA, WCDMA, GSM, LTE and EPC networks, and cloud computing networks), a memory that stores various programs and data to specified for implementing respectively corresponding operations and functions described herein in the present disclosure, and the one or more processors that executes programs so as to perform calculation and control, and the like.

The peer management device 300 is a server device that manages information about a peer which stores at least part of a file shared in a P2P-based file-distributed transmission service. Peers which share such files with each other may include a seeder which stores the entire shared file, and a Leecher which stores some fragments having a smaller size than an original size of the shared file. Conceptually, the seeder not only includes a peer which initially provides a shared file, but also includes a peer which downloads the entire shared file from other peers. This peer may correspond to one of the client devices 100. The peer management device 300 is implemented by one or more processors and/or application-specific integrated circuits (ASICs) specified for implementing respectively corresponding operations and functions described herein in the present disclosure. To communicate with the client devices 100 and the search device 200 through the communication network 10, the peer management device 300 comprises a communication device such as a communication modem that performs communication with various devices or wired/wireless communication networks (herein, the wire or wireless networks include, for example, one or more network interfaces including, but not limited to, cellular, LAN, WAN, CDMA, WCDMA, GSM, LIE and EPC networks, and cloud computing networks), a memory that stores various programs and data to specified for implementing respectively corresponding operations and functions described herein in the present disclosure, and the one or more processors that executes programs so as to perform calculation and control, and the like.

In the P2P-based file-distributed transmission system discussed above, a P2P-based file-distributed transmission process may be performed as follows.

At the outset, shared file information is created by a certain user (i.e., a user to use one or more client devices among the client devices 100) who desires to share a file(s) through a P2P-based file-distributed transmission service, and then be registered in the search server 200 connected to the communication network 10. Herein, the file(s) indicates a digital content such as, not limited to, text data, an image, augment reality data, video game data, audio data, video streaming data, a location-related data, and so on.

When shared file information is registered in the search device 200, in case that a user who desires to download the shared file accesses the search device 200 through a certain client device (e.g., 100-1), the client device (i.e., 100-1) receives the shared file information of the desired shared file through a search process (steps S105 and S110).

Additionally, the client device 100-1 accesses the peer management device 300 by using the shared file information, specifically, a unique identification value of the shared file and URL information of the peer management device 300 for managing peers, and then requests a peer list about the shared file (step S115). At this step, peers, i.e., the client devices 100, and the peer management device 300 communicate with each other by using HTTP (HyperText Transfer Protocol) protocol. Namely, a request for the peer list is made through, for example, an HTTP GET message.

The peer management device 300, which manages peers sharing the shared files, namely, peers being transmitting or receiving the shared file, based on an identification value of the shared file, creates a peer list by selecting a predetermined number of peers from among peers sharing the shared file in response to a request of the client device 100-1, and provides the peer list to the client device 100-1 (step S120). The peer list is transmitted through, for example, an HTTP RESPONSE message. Further, the client device 100-1 receives such a peer list that is also registered and managed as a peer for sharing the shared file in the peer management device 300 when storing a certain amount of file fragments.

The client device 100-1 performs P2P communication with one or more peers, among the other client devices 100-2 to 100-n, indicated in the peer list received from the peer management device 300, and thereby receives fragments of the shared file in parallel from the other client currently storing the fragments of the shared file (step S125). Specifically, the client device 100-1 requests file fragments by transmitting an identification value of the shared file to a peer corresponding to the peer list among the other client devices 100-2 to 100-n and thereby receives the file fragments of the shared file in parallel from one or more of the other client devices 100-2 to 100-n. Herein, the file fragments, for example, indicate one or more pieces into which a file (e.g., a specific shared file) has been broken into.

The client device 100-1 that obtains one or more file fragments from the other client devices 100-2 to 100-n through the above-discussed process is registered as Leecher in the peer management device 300 and transmits the obtained file fragments to another client device that requests the same shared file. In this case, another client device is, for example, a client device which is not indicated in the peer list received from the peer management device 300. Additionally, another client device eis, for example, a client device which is indicated in the peer list received from the peer management device 300 but fails to have the file fragments the client device 100-1 possesses.

If or when the client device 100-1 obtains all file fragments of the shared file through the above-discussed process, the client device 100-1 is registered and managed as a seeder in the peer management device 300.

As described above, in a P2P-based file-distributed transmission service, a plurality of peers indicated in the peer list provided by the peer management device 300 are selected randomly or selected on the basis of a download time, IP (Internet Protocol), or the like.

Regardless of whether peers are selected randomly or selected on a certain basis, the peer list provided by the peer management device 300 is created by a P2P-based file-distributed transmission service provider. Therefore, there is difficulty in considering the conditions of the communication network 10 where P2P communication is made actually between the client devices 100, or in satisfying demands of a communication operator.

Therefore, in the above-discussed P2P-based file-distributed transmission system, the present disclosure allows a third-party operator (e.g., a communication operator) to select properly and provide, without any change of the P2P-based file-distributed transmission system, peers with which the client device 100-1 exchanges shared files through P2P communication.

Figure 2:
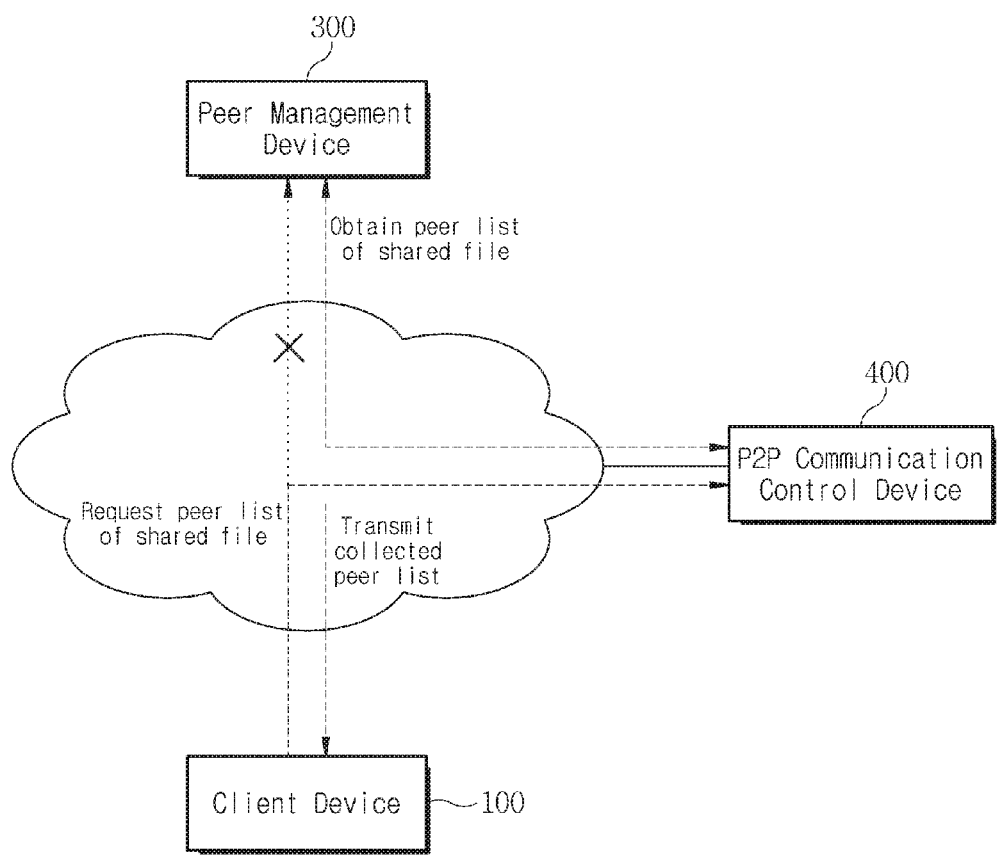
FIG. 2 is a block diagram of a file-distributed transmission system having a P2P communication control device according to at least one embodiment of the present disclosure.

For this, the present disclosure provides a P2P communication control device 400 connected to the communication network 10, which is the base of the P2P-based file-distributed transmission system, as shown in FIG. 2. The communication control device 400 is implemented by one or more processors and/or application-specific integrated circuits (ASICs) specified for implementing respectively corresponding operations and functions described herein in the present disclosure. To communicate with other devises such as the client devices 100 and the peer management device 300 through the communication network 10, the communication control device 400 comprises a communication device such as a communication modem that performs communication with various devices or wired/wireless communication networks (herein, the wire or wireless networks include, for example, one or more network interfaces including, but not limited to, cellular, LAN, WAN, CDMA, WCDMA, GSM, LTE and EPC networks, and cloud computing networks), a memory that stores various programs and data to specified for implementing respectively corresponding operations and functions described herein in the present disclosure, and the one or more processors that executes programs so as to perform calculation and control, and the like.

The P2P communication control device 400 monitors a message for a P2P-based file-distributed transmission service on the communication network 10, receives a peer list request message being transmitted from the client devices 100 to the peer management device 300, and receives, instead of the client devices 100, a peer list associated with a specific shared file from the peer management device 300. Additionally, the P2P communication control device 400 modifies the peer list of shared files received from the peer management device 300, based on predetermined policy information and depending on communication environments of the client devices 100, and then provides the modified peer list to the client devices 100.

Hereinafter, a P2P-based file transmission control method according to the present disclosure, performed through the P2P communication control device 400, will be described in detail with reference to FIG. 3.

Figure 3:
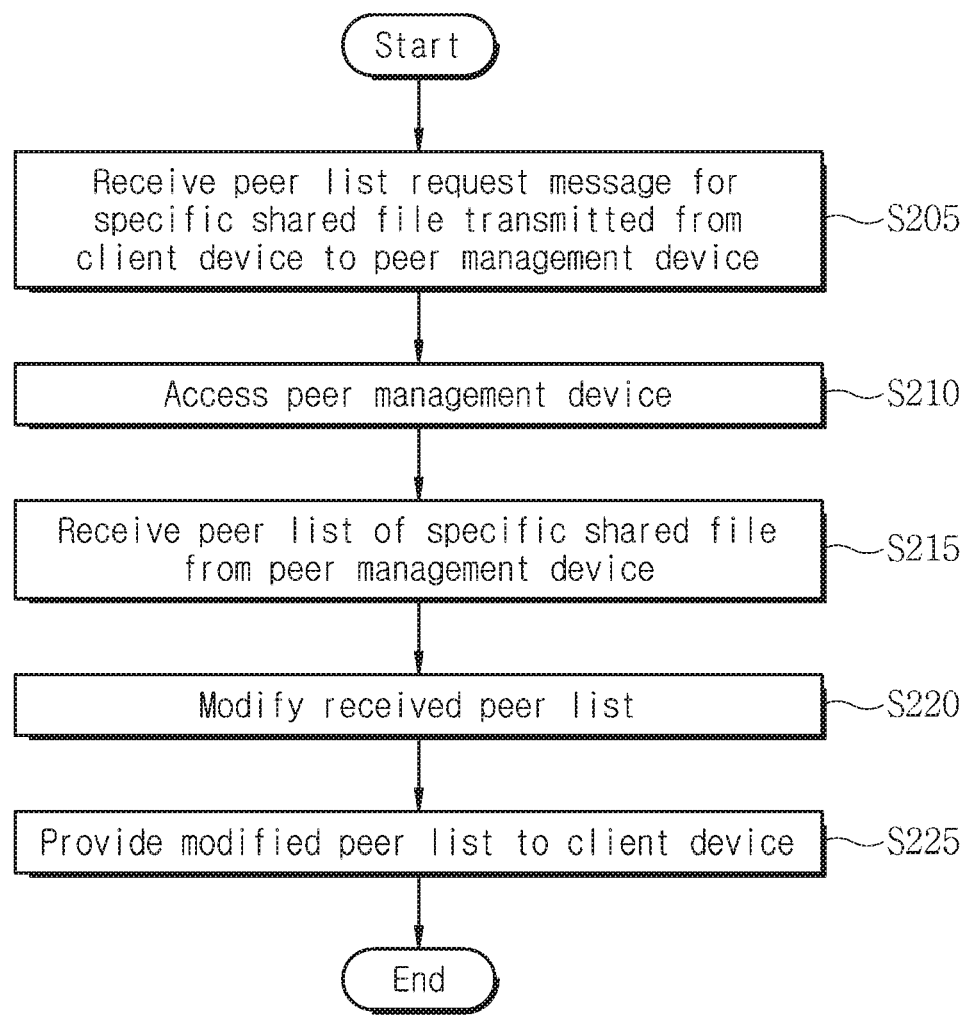
FIG. 3 is a flow diagram of a P2P-based file transmission control method according to at least one embodiment of the present disclosure.

FIG. 3 is a flow diagram of a P2P-based file transmission control method according to according to at least one embodiment of the present disclosure. Referring to FIG. 3, the P2P communication control device 400 monitors a message(s) being transmitted through the communication network 10 and collects a peer list request message being transmitted from the client devices 100 to the peer management device 300 in the P2P-based file-distributed transmission system (S205). Alternatively, the peer list request message being transmitted to the peer management device 300 is extracted on the basis of address information of the peer management device 300. Specifically, in the P2P-based file-distributed transmission system as shown in FIG. 1, the client device 100-1 that obtains shared file information about a shard file desired to be received sends, at step S115, a request for a peer list of a specific shared file to the peer management device 300 so as to check peers which share the shared file with each other. This request message is a message including information in which the peer management device 300 is set as a destination and an address of the client device 100-1 is set as a source. Therefore, the P2P communication control device 400 selectively receives a request message (e.g., an HTTP GET message) in which the address of the peer management device 300 is set as a destination. Specifically, by rerouting the request message (e.g., an HTTP GET message) having the address of the peer management device 300 as a destination while interworking with a router or a switch connected to the communication network 10, the peer management device 300 receives the request message. At this time, various techniques are used for receiving the peer list request message being transmitted from the client device 100 to the peer management device 300. For example, the P2P communication control device 400 filters a packet having the address of the peer management device 100 as a destination through Sinkhole routing such that the packet is forwarded to the P2P communication control device 400. Also, after receiving, by means of mirroring technique, a copy of a packet being transmitted through the communication network 10, the P2P communication control device 400 filters, from among such received packets, a packet having the address of the peer management device 300 as a destination.

Additionally, at the above step S205, in order to collect the peer list request message in which the peer management device 300 is set as a destination, the P2P communication control device 400 further periodically collects address information about one or more of the peer management device 300 used in the P2P-based file-distributed transmission system. Based on such collected address information, the peer list request message being transmitted to the peer management device 300 is selectively collected.

By the above step S205, the peer list request message transmitted from the client device 100-1 is delivered to the P2P communication control device 400 instead of being transmitted to a destination, i.e., the peer management device 300.

In this case, any message other than the peer list request message should normally arrive at the original destination. Therefore, at the above step S205, the P2P communication control device 400 checks whether address information in the request message collected through the communication network 10 is identical with an address of the peer management device 300, and also return any non-identical request message to the communication network 10. This returned request message is transmitted to the original destination through the communication network 10 and then processed normally.

Next, the P2P communication control device 400 that snatches (or intercepts) the peer list request message transmitted from the client device 100-1 accesses, instead of the client device 100-1, the peer management device 300 and requests a peer list (S210). At this time, as an exemplary embodiment of the present disclosure, the P2P communication control device 400 alternatively creates the peer list request message by using its own IP address and then sends the created message to the peer management device 300. As another exemplary embodiment of the present disclosure, the P2P communication control device 400 changes a source address of the peer list request message, received from the client device 100-1, to its own IP address and then sends the changed message to the peer management device 300.

The peer management device 300 that receives the peer list request message from the P2P communication control device 400 creates a peer list by selecting a certain number of peers from among many peers storing at least one of fragments of a shared file, based on an identification value of the shared file contained in the received peer list request message, and then transmits the created peer list. Herein, the identification value of the shared file indicates a value designated to identify each shared file or fragments of each shared file.

The created peer list is transmitted to the P2P communication control device 400 (S215). The P2P communication control device 400 stores, in a peer list DB (or a memory built therein), the peer list received from the peer management device 300. In this case, the peer list DB manages each peer list by indexing the peer list by means of one or more of an identification value of the shared file and identification information of the client device 100 that requests the peer list. The stored peer list is maintained by the P2P communication control device 400 while one or more of the client devices 100 is activated.

The P2P communication control device 400 modifies the peer list received from the peer management device 300, depending on communication environments of the client devices 100 (S220). Also, the P2P communication control device 400 alternatively or additionally modifies the received peer list by further referring to predetermined policy information. This policy information is, for example, a P2P traffic management policy established by an operator, e.g., a communication operator, of the P2P communication control device 400.

For example, at step S220, the P2P communication control device 400 checks communication environments of the client devices 100 and removes, from the peer list, a peer located in the communication network of other communication operator. Also, the P2P communication control device 400 collects routing information of the client devices 100 and, based on the collected routing information, modifies the peer list such that only a peer in the same operator's network or a neighboring peer near the same operator's network is contained in the peer list. Whether any peer belongs to the same operator's network or whether any peer neighbors near the same operator's network is determined by referring to, for example, AS (Autonomous System) information and Community information among routing information defined in BGP (Border Gateway Protocol). For reference, the AS information refers to a router group managed by one network operator, and is assigned to, e.g., each communication operator. The Community information is information about grouping of the router group and may be defined, e.g., regionally in the same operator network.

Additionally, as another exemplary embodiment of the present disclosure, the P2P communication control device 400 defines, based on the policy, the minimum accessible peer number and the maximum accessible peer number so as to limit accessible client devices 100, or select, based on a hop count or a round trip time (RTT) from the client device 100-1 to each peer contained in the peer list, a peer only having a predetermined hop count or RTT. Herein, the accessible peer number indicates the number of peers (i.e., client devices 100) to be accessible in order for the client device 100-1 to receive and/or exchange fragments of the shared file.

Additionally, the P2P communication control device 400 offers the modified peer list to the client device 100-1 (S225). Then the client device 100-1 communicates with a plurality of peers contained in the received peer list so as to exchange fragments of the shared file. These peers contained (namely, indicated) in the peer list are peers selected by the P2P communication control device 400. Therefore, the client device 100-1 performs P2P communication with peers selected by the P2P communication control device 400.

At the above step S225, the P2P communication control device 400 transmits the modified peer list to the client device 100-1 through, for example, the HTTP RESPONSE message. At this time, the HTTP RESPONSE message is processed as if being transmitted from the peer management device 300. For example, when the HTTP RESPONSE message that contains the modified peer list is transmitted, an IP address of the peer management device 300 instead of an IP address of the P2P communication control device 400 is used as a source address of the HTTP RESPONSE message.

Therefore, as usual, the client device 100-1 recognizes that a response is received from the peer management device 300.

Additionally, while the client device 100-1 that receives the peer list as discussed above exchanges, through P2P communication, a specific shared file with one or more of the client devices contained in the peer list among the other client devices 100-2 to 100-n, the client device 100-1 periodically notifies a Keep alive message to the peer management device 300 such that the peer management device 300 is able to manage a peer status in real time.

At this time, the P2P communication control device 400 collects the Keep alive message being transmitted from the client device 100-1 to the peer management device 300 and updates the peer list DB, stored at the above-discussed step S215, by referring to the collected Keep alive message. Specifically, the P2P communication control device 400 collects a Keep alive message being transmitted to the peer management device 300 through the communication network 10, identifies the client devices 100 transmitting the Keep alive message by referring to a source address of the collected Keep alive message, and maintains an activated state of a peer list allocated to the identified client devices 100. On the other hand, the client devices 100 that fails to send a Keep alive message for a given time are determined to be in an unavailable state for P2P communication due to power-off, etc., and thereby the peer list DB is updated.

Additionally, the P2P communication control device 400 offers the peer list to the client devices 100 by referring to the peer list DB managed as discussed above.

Specifically, if or when the peer list request message is received through step S205, the P2P communication control device 400 extracts, from the peer list DB, peers associated with a shared file requested by the client devices 100, creates a peer list of the extracted peers, and offers the created peer list to the client devices 100 before performing steps S210 and S215.

Through the above process and through the P2P communication control device 400, a communication operator manages properly P2P traffic without any change of the P2P-based file-distributed transmission system, especially the peer management device 300, and also induces access to peers in its own communication network thereof rather than peers in other operators' communication network. This obtains advantageous effects of some exemplary embodiments to reduce IX interworking traffic and thereby solve a managing issue of IX interworking point.

The aforesaid P2P-based file transmission control method of this present disclosure is implemented in the form of a program being readable through various computing manners and is recorded in a non-transitory computer-readable storage medium. This computer program (also known as a program, software, software application, script, commands and instructions or code) is implemented by one or more processors specified for implementing respectively corresponding operations and functions described herein in the present disclosure. And the computer program that executes the P2P-based file transmission control method according to the present disclosure is written in any form of programming languages including a compiled or interpreted language and developed in any form including a stand-alone program, module, component, subroutine, or other unit suitable for use in computer environments. A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The non-transitory computer-readable storage medium suitable for storing computer program commands and data may include all kinds of nonvolatile memories, media, and memory devices, including a semiconductor memory device such as EPROM, EEPROM and flash memory, a magnetic disk such as an internal hard disk or an external disk, and an optical disk such as CD-ROM and DVD-ROM. A processor and memory is supplemented by a special-purpose logic circuit or integrated therewith.

Figure 4:
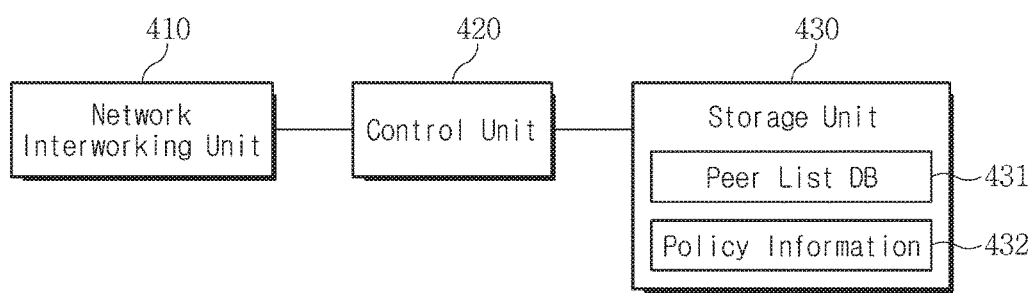
FIG. 4 is a block diagram of a detailed structure of a P2P communication control device according to at least one embodiment of the present disclosure.

FIG. 4 is a block diagram of the structure of the P2P communication control device 400 that operates as discussed above, according to at least one embodiment of the present disclosure.

Referring to FIG. 4, the P2P communication control device 400 includes a network interworking unit 410, a control unit 420, and a storage unit 430. Each of the network interworking unit 410 and the control unit 420 is implemented by one or more processors and/or application-specific integrated circuit's (ASICs) specified for implementing respectively corresponding operations and functions described herein in the present disclosure.

The network interworking unit 410 monitors a packet (or message(s)) being transmitted through the communication network 10 and collects a peer list request message being transmitted from the client devices 100 to the peer management device 300. The network interworking unit 410 snatches (or intercepts) the peer list request message transmitted from the client device 100-1 accesses to the peer management device 300. At this time, the network interworking unit 410 collects address information about one or more of the peer management device 300 and, based on the collected address, collects the peer list request message being transmitted from the client device 100 to the peer management device 300. Also, the network interworking unit 410 receives the peer list request message having the address of the peer management device 300 as a destination through Sinkhole routing or mirroring technique while interworking with a router or a switch located in the communication network 10. At this time, the peer list request message received through the network interworking unit 410 is not delivered to the peer management device 300.

Additionally, the network interworking unit 410 checks whether a destination address of the received request message is identical with an address of the peer management device 300, and then returns any non-identical request message to the communication network 10 to be processed normally.

Next, when the peer list request message being transmitted from the client device 100 to the peer management device 300 is received through the network interworking unit 210, the control unit 220 controls, instead of the client devices 100, access to the peer management device 300 and reception of a peer list indicating information about peers sharing the shared file. Then the control unit 220 modifies the received peer list, based on communication environments of the client devices 100, and controls the network interworking unit 210, instead of the peer management device 300, to transmit the modified peer list to the client devices 100. Through the control unit 220, a peer list adapted to communication environments of the client devices 100 is provided.

For this, the control unit 220 collects routing information of the client devices 100 from the communication network 10 and, based on the collected routing information, modifies the peer list.

The storage unit 430 is an element for storing data required for the operation of the P2P communication control device 400. While processed in the control unit 220, the storage unit 430 temporarily stores the received peer list request message and a peer list received from the peer management device 300. Also, the storage unit 430 stores routing information of the client devices 100 collected by the control unit 220.

Particularly, the storage unit 430 includes a peer list DB 431 that stores peer lists received from the peer management device 300. The control unit 420 indexes the peer list DB 431 using one or more of an identification value of a shared file and identification information of the client devices 100. Also, the control unit 420 collects, through the network interworking unit 410, a Keep alive message being transmitted from the client devices 100 to the peer management device 300 and update the peer list DB 431 by using the collected Keep alive message. Specifically, the control unit 420 identifies the client devices 100 transmitting the Keep alive message by referring to a source address of the collected Keep alive message, and maintains an activated state of a peer list allocated to the identified client devices 100. On the other hand, the control unit 420 may determine that the client devices 100 failing to send a Keep alive message for a given time is in an unavailable state for P2P communication due to power-off, etc., and thereby updates the peer list DB 431 to remove it from the peer list DB 431.

Additionally, the control unit 420 offers the peer list to the client devices 100 by using the peer list DB 431. Specifically, when the peer list request message is received from the client device 100, the control unit 420 checks whether a peer list of a shared file in the peer list DB 431. If stored, the control unit 420 creates a peer list by extracting peers sharing the shared file requested by the client devices 100, based on the peer list DB 431 of the storage unit 430, and offer the created peer list to the client devices 100.

Additionally, the storage unit 430 further includes policy information 432 which is defined for peer selection by the third-party operator (e.g., a communication operator) managing the P2P communication control device 400 rather than by an operator managing the P2P-based file-distributed transmission system. The control unit 220 modifies the peer list, based on the policy information 432. For example, the policy information 432 includes peer selection priorities of other communication operators or a peer selection criterion in the communication network 10. Also, the policy information 432 includes the minimum accessible peer number and the maximum accessible peer number for limiting accessible client devices 100, and a hop count or a round trip time (RTT) reference value (e.g., the minimum value or the maximum value) between the client device 100-1 and a peer. Based on this policy information 432, the control unit 420 performs a modification of the peer list such as limiting the minimum accessible peer number or the maximum accessible peer number for each of the client devices 100, selecting a peer having a hop count or RTT defined as a policy with the client devices 100, and the like.

The aforesaid P2P communication control device 400 according to the present disclosure is operated by commands that enable one or more processors to perform the above-discussed functions and process. For example, such commands may include interpretable commands such as script command, e.g., JavaScript or ECMAScript, executable code, or other commands stored in a computer-readable medium. Further, the P2P communication control device 400 according to the present disclosure is implemented in a distributed form, such as Server Farm, over the network or implemented in a single computer device.

According to various embodiments of the present disclosure, the P2P communication control device modifies a peer list without any change or intervention of a client device or peer management device that performs a typical P2P communication service procedure, by receiving a peer list request message being transmitted from client device(s) to the peer management device through a communication network, obtaining, instead of the client device(s), a peer list from the peer management device, modifying the obtained peer list in accordance with a communication environment of the client device(s), and providing, instead of the peer management device, the modified peer list to the client device(s).

As a result, a third party, e.g., an operator of the communication network for connecting the client device(s) and the peer management device, rather than a user or service provider directly related to a P2P service, randomly modifies a peer list without the knowledge of the client device(s) or peer management device that performs a typical P2P communication procedure, allow a communication operator to effectively manage P2P traffic, and minimize unnecessary IX interworking traffic.

Although an exemplary configuration of the P2P communication control device 400 is disclosed in the description and drawings, the above-discussed various embodiments of functional operations and subject matters of the present disclosure are implemented in any other type of digital electronic circuitry, or in any computer software, firmware or hardware including the structures disclosed herein and their structural equivalents, or in any combination thereof. Various embodiments of the present disclosure are implemented as one or more computer program products, i.e., one or more modules of computer program instructions encoded on a program storage medium for execution by, or to control the operation of, the apparatus according to this disclosure. A non-transitory computer-readable medium includes a machine-readable storage device, a machine-readable storage substrate, a memory device, a machine-readable composition of material affecting a radio wave type signal, or any combination thereof.

Various modifications to the implementations described in this disclosure are readily apparent to those skilled in the art, and the generic principles defined herein are applied to other implementations without departing from the scope and spirit of the claimed invention as disclosed in the accompanying claims. Thus, the disclosure is not intended to be limited to the implementations shown herein, but is to be accorded the widest scope consistent with the accompanying claims, the principles and the novel features disclosed herein. Certain features that are described in this specification in the context of separate implementations also can be implemented in combination in a single implementation. Conversely, various features that are described in the context of a single implementation are also implemented in multiple implementations separately or in any suitable sub-combination. Moreover, although features are described above as acting in certain combinations and even initially claimed as such, one or more features from a claimed combination are, in some cases, excised from the combination, and the claimed combination is directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing are advantageous. Moreover, the separation of various system components in the implementations described above should not be understood as requiring such separation in all implementations, and it should be understood that the described program components and systems can generally be integrated together in a single software product or packaged into multiple software products.

Additionally, other implementations are within the scope of the following claims. In some cases, the actions recited in the claims are performed in a different order and still achieve desirable results. Further, the drawings schematically depict one more example processes in the form of a flow diagram. However, other operations that are not depicted are incorporated in the example processes that are schematically illustrated. For example, one or more additional operations are performed before, after, simultaneously, or between any of the illustrated operations.

While the present disclosure has been particularly shown and described with reference to various exemplary embodiments thereof, it will be understood by those skilled in the art that various changes in form and details are made therein without departing from the scope and spirit of the claimed invention. Specific terms used in this disclosure and drawings are used for illustrative purposes and not to be considered as limitations of the present disclosure. Therefore, exemplary embodiments of the present disclosure have been described for the sake of brevity and clarity.

Accordingly, the scope of the claimed invention should be defined by the appended claims and embodiments disclosed herein.

What is claimed is:

1. A P2P-based file transmission control method performed by a peer-to-peer (P2P) communication control device, the method, implemented by one or more processors comprised in the P2P communication control device, comprising:

controlling, by the P2P communication control device disposed between a client device and a peer management device in a communication network, the P2P-based file transmission to modify a peer list without intervention of the client device or the peer management device by selectively collecting a peer list request message having an address of the peer management device as a destination;

wherein the controlling comprises
receiving, instead of the peer management device, the peer list request message transmitted to the peer management device by the client device;
sending, instead of the client device, a request for the peer list for a shared file to the peer management device;
receiving the peer list from the peer management device;
modifying the received peer list in accordance with a communication environment of the client device; and
providing the modified peer list to the client device, wherein the receiving of the peer list request message includes
receiving a request message having the address of the peer management device as the destination;
filtering the packet having the address of the peer management device as a destination, wherein the receiving of the peer list request message further includes
checking whether a destination address of the received message is identical with the address of the peer management device, and
returning a non-identical message to the communication network.

2. The method of claim 1, wherein the receiving of the peer list request message further includes
collecting address information of one or more peer management devices, and
receiving a request message having the collected address information as a destination.

3. The method of claim 1, wherein the modifying of the received peer list includes modifying the peer list, based on routing information of the client device.

4. The method of claim 1, wherein the modifying of the received peer list further includes
collecting routing information of the client device from the communication network.

5. The method of claim 1, wherein the receiving of the peer list request message further comprising:
monitoring messages being transmitted through the communication network to collect the peer list request message transmitted from the client device to the peer management device; and
intercepting the peer list request message, when the peer list request message is monitored.

6. The method of claim 1, wherein the peer list contains a list of one or more client devices to exchange or use the shared file.

7. A peer-to-peer (P2P) communication control device disposed in a communication network for connecting a client device and a peer management device, the device, disposed between a client device and a peer management device in a communication network, configured to control the P2P-based file transmission to modify a peer list without intervention of the client device or the peer management device by selectively collecting a peer list request message having an address of the peer management device as a destination;

the device comprising:
a network interworking unit, implemented by one or more processors, configured to
monitor messages being transmitted through the communication network to collect a peer list request message transmitted to the peer management device by the client device,
receive, instead of the peer management device, the peer list request message, and
transmit, instead of the peer management device, a peer list to the client device; and
a control unit, implemented by one or more processors, configured to
send, instead of the client device, a request for the peer list to the peer management device,
receive the peer list from the peer management device in response to the request for the peer list,
modify the received peer list in accordance with a communication environment of the client device, and
provide the modified peer list to the client device,
wherein the network interworking unit is further configured to
check whether a destination address of the received message is identical with the address of the peer management device, and
return a non-identical message to the communication network.

8. The device of claim 7, wherein the network interworking unit is further configured to
collect address information of one or more peer management devices, and
receive the peer list request message having the collected address information as a destination.

9. The device of claim 7, wherein the control unit is further configured to
collect routing information of the client device, and
modify the peer list, based on the collected routing information.

10. The device of claim 7, further comprising:
a storage unit including a peer list DB for storing the peer list received from the peer management device,
wherein when a peer list of a shared file requested by the client device stored in the peer list DB, the control unit is further configured to
modify the peer list, extracted from the peer list DB, in accordance with a communication environment of the client device, and
transmit the modified peer list before sending a request for the peer list to the peer management device.

11. The device of claim 7, wherein the peer list contains a list of one or more client devices to exchange or use the shared file.

12. The device of claim 7, wherein the network interworking unit is further configured to
intercept the peer list request message, when the peer list request message is monitored.

13. A P2P-based file transmission control method performed by a peer-to-peer (P2P) communication control device, the method, implemented by one or more processors comprised in the P2P communication control device, comprising:

controlling, by the P2P communication control device disposed a client device and a peer management device in a communication network, transmission of fragments of a shared file to at least one client device in P2P-based file-distributed transmission to modify a peer list without intervention of the client device or the peer management device by selectively collecting a peer list request message having an address of the peer management device as a destination, wherein the controlling comprising:

monitoring messages being transmitted through the communication network to collect a peer list request message transmitted from the client device to the peer management device;

intercepting the peer list request message, when the peer list request message is monitored among the messages;

sending a request for the peer list to the peer management device based on the intercepted peer list request message;

receiving the peer list transmitted from the peer management device in response to the request for the peer list;

modifying the received peer list in accordance with a communication environment of the client device; and providing the modified peer list to the client device, wherein the controlling further comprising checking whether a destination address of the received message is identical with the address of the peer management device, and returning a non-identical message to the communication network.

14. The method of claim 13, wherein the peer list contains a list of one or more client devices to exchange or use the shared file.

\* \* \* \* \*